Feb. 19, 1924.                                                          1,484,193
W. C. SCOTT
SHOCK ABSORBER
Filed Jan. 17, 1918          2 Sheets-Sheet 1

Inventor:
Walter C. Scott
by
Atty.

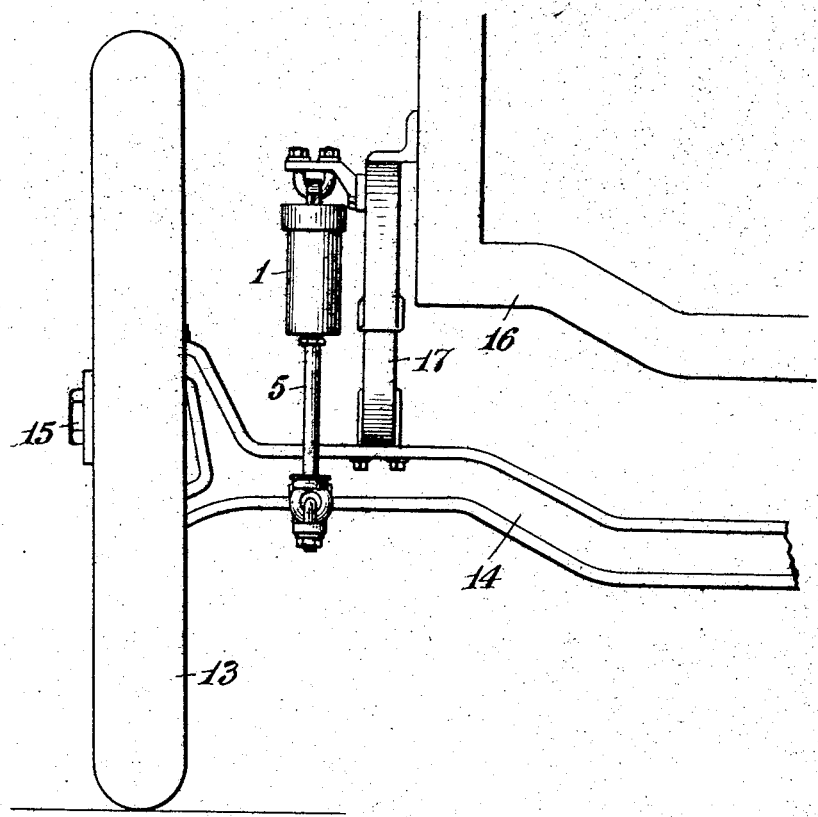

Patented Feb. 19, 1924.

1,484,193

UNITED STATES PATENT OFFICE.

WALTER C. SCOTT, OF PLAINFIELD, NEW JERSEY.

SHOCK ABSORBER.

Application filed January 17, 1918. Serial No. 212,256.

*To all whom it may concern:*

Be it known that I, WALTER C. SCOTT, a citizen of the United States, and a resident of the city of Plainfield, county of Union, and State of New Jersey, have invented certain new and useful Improvements in Shock Absorbers, of which the following is a specification.

The present invention relates generally to shock absorbers such as are used in connection with automobiles, or for the purpose of assisting in the reversal of reciprocating beds for printing machines, or to take up the recoil of guns.

The main object and feature of the invention is to not merely check or retard the shock to be absorbed, but to both check and cushion it. By "checking" is here meant retarding the action as by passage of liquid from one chamber to another. This, it will be understood, does not limit the amplitude of movement, but merely slows down the speed thereof. By "cushioning" is meant the provision of a spring—either liquid or air—for actually limiting the movement when a resistance equal to the shock has been created.

Another feature of the invention is the provision of means whereby the device will automatically adjust itself to varying shocks, and that will automatically adjust itself to variations in load, so that as the load increases the power of shock absorption is likewise increased.

Other features will appear as the specification proceeds.

For the sake of convenience, the invention is here embodied in an illustrated preferred form for use as a shock absorber for automobiles or trucks; and in said drawings:—

Fig. 3 is a view of a portion of an automobile showing how the device of my invention may be applied thereto.

Figure 2:
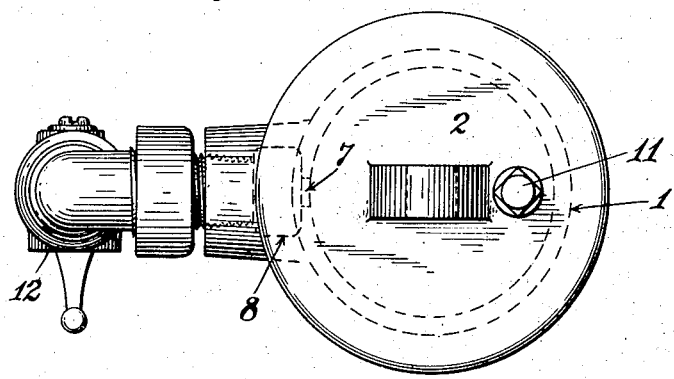
Fig. 2 is a top plan view of Fig. 1.
Figure 1:
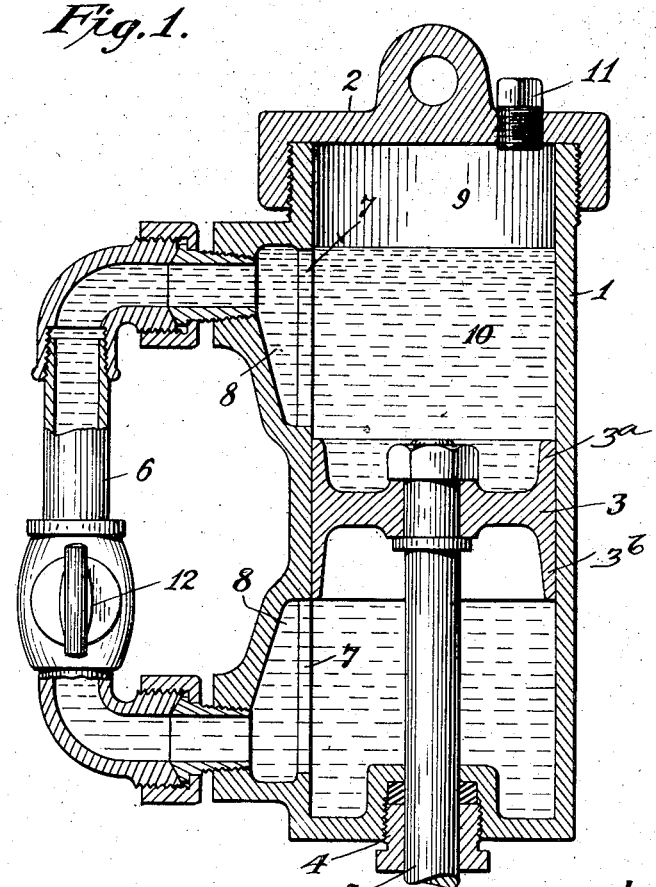
Fig. 1 is a vertical sectional view through the device showing the position normally occupied by the parts.

1 indicates a casing of any suitable construction, which, in the present instance, is secured by means of cap 2 to a bracket on the frame of the vehicle forming an upper movable member. 3 indicates a piston or plunger element normally occupying the position shown in Fig. 1 and dividing the casing into two compartments or into an upper and a lower chamber as shown, there being no possible flow of liquid through this piston. This piston forms a lower movable member and has concave upper and lower faces $3^a$ and $3^b$. 4 is a stuffing box of suitable construction through which the piston rod 5 passes, said piston rod being suitably connected to the axle of the motor vehicle. 6 is a conduit that connects the upper and lower ends of the casing with each other, said conduit constituting a normally open means of communication between the two ends of said casing. 7 indicate ports, which, in the present instance, are shown as long narrow slots formed in the side walls of the casing and opening into an intermediate chamber 8 with which conduit 6 is in communication. It will be noted that port 7 at the upper end of the casing is at a point well below the extreme upper end thereof so that an air chamber 9 is formed, and that the port 7 at the lower end of the casing is well above the bottom thereof. A body of liquid 10 is contained within the casing surrounding piston 3 and fills conduit 6 and the ports and passages leading thereto. The upper level of the liquid 10 really denotes the beginning of the so-called air chamber 9, and it will be observed that upper concave face $3^a$ contains a body of liquid, while lower concave face $3^b$ constitutes an air chamber. 11 is a plug by means of which the casing may be opened for the purpose of introducing liquid. It will be noted that piston 3 is normally immersed in the liquid and occupies a position intermediate the two ports 7. It will further be seen that the length of the piston is such that it is shorter than the length of either of the slots or ports 7, the parts being mounted in a manner described and in such a way that the springs usually associated with motor vehicles will tend to move the parts to the position shown in Fig. 1. It will be understood that when a shock is imparted, piston 3 will rise, thereby displacing liquid through the upper port 7 and conduit 6 to the lower part of the casing. If the shock be of relatively small force, the movement of the piston will be correspondingly small and the shock will be entirely absorbed by displacement of the liquid in the manner described; but, if the shock imparted be relatively great, then it will be understood that as piston 3 rises it will gradually close port 7 thereby making it more difficult for the liquid to escape through conduit 6 to the lower part of the casing which will therefore correspondingly offer a resistance to the shock in proportion to its amplitude. Should the shock be of an extreme character, piston 3 will gradually rise so that it will eventually close port 7 at the upper end thereof thereby forming an air cushion in air chamber 9 which will effectually stop the advance of the piston. Furthermore, on the rebound, this air cushion tends to restore piston 3 to its mid-position, this action also being facilitated by the usual springs on the motor vehicle. As piston 3 descends on the rebound, it will gradually open port 7 and will make it increasingly more effective to displace liquid from the lower part of the casing to the upper part thereof and if the rebound should be so great as to move the piston below its normal position, it will be understood that the shock would be absorbed by gradually displacing liquid through the increasingly restricted opening 7 from the lower to the upper part of the casing, and finally when lower port 7 is closed the body of air contained in the concave face 3ᵇ of the piston will cushion and stop downward movement of said piston. The piston 3 is made of a length slightly less than that of port 7 to prevent it from coming to rest with port 7 closed and the air in the chamber 9 not compressed in which case it might remain in this position and fail to return sufficiently to partly uncover port 7. Preferably, there is a valve 12 interposed in conduit 6 by means of which the passage of liquid through conduit 6 may be controlled at will by restricting it more or less, if for any reason such adjustment should be desired. This adjustment does not in any way conflict with the power possessed by the device to automatically increase the shock absorbing power in proportion to the shock received.

A further advantage is obtained by the use of ports such as 7 in that if the load on the vehicle increases, the weight thereof will naturally move the piston 3 to some extent thereby partly closing port 7 and in that manner varying the responsiveness of the device automatically in proportion to variations in the load for it will be obvious that the partial closing of port 7 due to an increase in the load will cause the liquid to pass through a restricted opening thereby offering some resistance to its flow.

In connection with this matter, attention is called to Fig. 3 in which the device is shown applied to an automobile. As here indicated, 13 is the road wheel, 14 the transverse bar carrying the axles 15 of the road wheels, and 16 is the body of the car partially supported by spring 17 and partially supported by the cushioning device of my invention. In the form here disclosed, casing 1 is suitably connected to the body 16 of the car while the piston rod 5 is connected to the transverse bar 14. Preferably the spring 17 is a light leaf spring which will hold only the weight of the body and the frame of the car and if used alone will break under any load applied to the car. The load on the vehicle is therefore supported by the cushioning device which adjusts itself in a manner previously described to variations in the load.

I claim:

1. A shock absorber comprising: a casing having a port adjacent to but below its upper end and a port adjacent to but above its lower end, a connection between said ports extraneous of the interior of the casing, said casing being partially filled with a body of liquid free to flow through said connection, and a piston, constituting a valve for the ports, immersed in said liquid, said piston having upper and lower concave faces, to form a liquid pocket on its upper side and an air pocket on its lower side, and dividing the casing into an upper and a lower chamber that are in communication with each other through aforesaid connection, said casing and piston being movably related to each other in response to shocks.

2. A shock absorber comprising: a casing and a piston movably related to each other in response to shocks, said casing containing a body of liquid in which the piston is normally immersed, and valve means associated with said casing and piston for automatically adjusting the shock absorbing qualities of the device in response to an increase in load.

3. A shock absorber comprising: a casing and a piston movably related to each other in response to shocks, said casing containing a body of liquid in which the piston is normally immersed, and valve means associated with said casing and piston for automatically increasing the resistance of the body of liquid in proportion to the shock to be absorbed.

4. A shock absorber comprising: a casing and a piston movably related to each other in response to shocks, said casing containing a body of liquid in which the piston is normally immersed, and means associated with said casing and piston for automatically increasing the resistance offered to the flow of liquid in proportion to the shock to be absorbed.

5. A shock absorber comprising: a casing having a port adjacent to but below its upper end and a port adjacent to but above its lower end, a connection between said ports extraneous of the interior of the casing, said casing and connection containing a body of liquid, and a piston, constituting a valve for the ports, immersed in the liquid and dividing the casing into an upper and a lower chamber that are in communication with each other through aforesaid connection, said casing and piston being movably related to each other in response to shocks, and means for automatically increasing the resistance offered to the flow of liquid from one chamber to the other in proportion to the shock to be absorbed.

6. A shock absorber comprising: a casing having a port adjacent to but below its upper end and a port adjacent to but above its lower end, a connection between said ports extraneous of the interior of the casing, said casing and connection containing a body of liquid, a piston, constituting a valve for the ports, immersed in the liquid and dividing the casing into an upper and a lower chamber that are in communication with each other through aforesaid connection, said casing and piston being movably related to each other in response to shocks, and means for automatically adjusting the shock absorbing qualities of the device in response to an increase in load.

Signed at Washington, in the District of Columbia, U. S. A. this 17 day of January, 1918.

WALTER C. SCOTT.